US012614523B2

(12) United States Patent
Zhang et al.

(10) Patent No.: US 12,614,523 B2
(45) Date of Patent: Apr. 28, 2026

(54) DISPLAY PANEL AND DISPLAY APPARATUS

(71) Applicant: BOE TECHNOLOGY GROUP CO., LTD., Chaoyang District (CN)

(72) Inventors: Xing Zhang, Beijing (CN); Pan Xu, Beijing (CN); Ying Han, Beijing (CN); Chengyuan Luo, Beijing (CN); Donghui Zhao, Beijing (CN); Guangshuang Lv, Beijing (CN); Cheng Xu, Beijing (CN)

(73) Assignee: BOE Technology Group Co., Ltd., Chaoyang District (CN)

( * ) Notice: Subject to any disclaimer, the term of this patent is extended or adjusted under 35 U.S.C. 154(b) by 0 days.

(21) Appl. No.: 18/696,855

(22) PCT Filed: Feb. 1, 2023

(86) PCT No.: PCT/CN2023/074105

§ 371 (c)(1),
(2) Date: Mar. 28, 2024

(87) PCT Pub. No.: WO2024/159448

PCT Pub. Date: Aug. 8, 2024

(65) Prior Publication Data

US 2025/0037667 A1 Jan. 30, 2025

(51) Int. Cl.

*G09G 3/3266* (2016.01)
*G09G 3/32* (2016.01)

(Continued)

(52) U.S. Cl.

CPC ......... *G09G 3/3266* (2013.01); *G09G 3/3233* (2013.01); *G09G 3/32* (2013.01);

(Continued)

(58) Field of Classification Search

None

See application file for complete search history.

(56) References Cited

U.S. PATENT DOCUMENTS 9,384,695 B2 * 7/2016 Lee ..................... G09G 3/3266
2005/0190134 A1 9/2005 Wang et al.

(Continued)

FOREIGN PATENT DOCUMENTS

CN 101984485 A 3/2011
CN 107644605 A 1/2018

(Continued)

*Primary Examiner* — Andre L Matthews

(74) *Attorney, Agent, or Firm* — The Webb Law Firm

(57) ABSTRACT

A display panel includes a plurality of rows of pixel circuits, one or more rows of first dummy pixel circuits, a plurality of cascaded scanning driving units and at least one first dummy scanning driving unit. The plurality of rows of pixel circuits are arranged in a first direction. The one or more rows of first dummy pixel circuits are located on a side of the plurality of rows of pixel circuits in the first direction. Each scanning driving unit is configured to transmit a scanning signal to at least one row of pixel circuits. A first dummy scanning driving unit is cascaded to a first stage of scanning driving unit among the plurality of scanning driving units, and is configured to transmit; a cascade signal to the first stage of scanning driving unit; and transmit scanning signals to at least one row of first dummy pixel circuits.

16 Claims, 6 Drawing Sheets

1000

(51) Int. Cl.
*G09G 3/3233* (2016.01)
*G09G 3/36* (2006.01)

(52) U.S. Cl.
CPC ... *G09G 3/3674* (2013.01); *G09G 2300/0408* (2013.01); *G09G 2300/0413* (2013.01); *G09G 2300/0819* (2013.01); *G09G 2300/0852* (2013.01); *G09G 2300/0861* (2013.01); *G09G 2310/0286* (2013.01); *G09G 2320/0233* (2013.01)

(56) References Cited

U.S. PATENT DOCUMENTS

| | | | | |
|---|---|---|---|---|
| 2012/0086627 | A1 | 4/2012 | Chen et al. | |
| 2016/0321990 | A1* | 11/2016 | Kim | G09G 3/3233 |
| 2016/0379586 | A1 | 12/2016 | Wu et al. | |
| 2020/0251066 | A1* | 8/2020 | Hu | G09G 3/3677 |
| 2020/0273417 | A1* | 8/2020 | Zhao | G09G 3/3614 |

FOREIGN PATENT DOCUMENTS

| | | | |
|---|---|---|---|
| CN | 108694903 | A | 10/2018 |
| CN | 108922491 | A | 11/2018 |
| CN | 109061963 | A | 12/2018 |
| CN | 110718180 | A | 1/2020 |
| CN | 114005411 | A | 2/2022 |
| JP | 201935842 | A | 3/2019 |
| KR | 1020080000746 | A | 1/2008 |
| KR | 1020080040448 | A | 5/2008 |

* cited by examiner

DISPLAY PANEL AND DISPLAY APPARATUS

CROSS-REFERENCE TO RELATED APPLICATION

The present application is the United States national phase of International Patent Application No. PCT/CN2023/074105, filed Feb. 1, 2023, the disclosure of which is hereby incorporated by reference in its entirety.

BACKGROUND OF THE INVENTION

Field of the Invention

The present disclosure relates to the field of display technologies, and in particular, to a display panel and a display apparatus.

Description of Related Art

In a display apparatus, the function of the gate driver circuit is to output an open-state voltage (i.e., a scanning signal or gate driving signal) of the thin film transistor (TFT). Integrating the gate driver circuit onto the array substrate of the display panel, i.e., gate driver on array (GOA), which may replace the driver chip disposed outside of the array substrate and has the advantages of low cost, few processes, and high productivity.

The gate driver circuit includes a plurality of cascaded scanning driving units, or the gate driver circuit includes a plurality of stages of scanning driving units arranged in sequence. The scanning driving unit includes a plurality of shift registers for outputting different scanning signals to at least one row of pixel circuits, and each shift register is used for outputting a type of scanning signal.

SUMMARY OF THE INVENTION

In an aspect, a display panel is provided. The display panel includes a plurality of rows of pixel circuits, one or more rows of first dummy pixel circuits, a plurality of cascaded scanning driving units and at least one first dummy scanning driving unit. The plurality of rows of pixel circuits are arranged in a first direction. The one or more rows of first dummy pixel circuits are located on a side of the plurality of rows of pixel circuits in the first direction. Each scanning driving unit of the plurality of scanning driving units is configured to transmit a scanning signal to at least one row of pixel circuits. The at least one first dummy scanning driving unit is cascaded to a first stage of scanning driving unit among the plurality of scanning driving units, and a first dummy scanning driving unit is configured to: transmit a cascade signal to the first stage of scanning driving unit; and transmit scanning signals to at least one row of first dummy pixel circuits of the one or more rows of first dummy pixel circuits.

In some embodiments, the display panel includes a plurality of first dummy scanning driving units that are cascaded. A last stage of first dummy scanning driving unit among the plurality of first dummy scanning driving units is cascaded to the first stage of scanning driving unit.

In some embodiments, the display panel includes a plurality of rows of first dummy pixel circuits; the first dummy scanning driving unit is configured to transmit the scanning signals to at least two rows of first dummy pixel circuits. The first dummy scanning driving unit includes a first shift register and a second shift register. The first shift register is connected to a row of first dummy pixel circuits of the at least two rows of first dummy pixel circuits and configured to output a scanning signal to the corresponding connected row of first dummy pixel circuits, and the second shift register is correspondingly connected to the at least two rows of first dummy pixel circuits and configured to output a scanning signal to the at least two corresponding connected rows of first dummy pixel circuits.

In some embodiments, the scanning signal output by the first shift register is different from the scanning signal output by the second shift register.

In some embodiments, a circuit structure of a first dummy pixel circuit is the same as a circuit structure of a pixel circuit.

In some embodiments, a circuit structure of the first dummy scanning driving unit is the same as a circuit structure of a scanning driving unit.

In some embodiments, a circuit structure of the first dummy scanning driving unit is different from a circuit structure of a scanning driving unit.

In some embodiments, the display panel further includes at least one row of second dummy pixel circuits and at least one second dummy scanning driving unit. The at least one row of second dummy pixel circuits are located on a side of the plurality of rows of pixel circuits away from the at least one row of first dummy pixel circuits. The at least one second dummy scanning driving unit is cascaded to a last stage of scanning driving unit among the plurality of scanning driving units and is configured to: receive a cascade signal output by the last stage of scanning driving unit; and output a scanning signal to the at least one row of second dummy pixel circuits.

In some embodiments, a number of rows of first dummy pixel circuits included in the display panel is equal to a number of rows of second dummy pixel circuits included in the display panel, and a number of first dummy scanning driving units included in the display panel is equal to a number of second dummy scanning driving units included in the display panel.

In some embodiments, a circuit structure of a second dummy pixel circuit is the same as a circuit structure of a pixel circuit.

In some embodiments, a circuit structure of a second dummy scanning driving unit is the same as a circuit structure of a scanning driving unit.

In some embodiments, a circuit structure of a first dummy pixel circuit is the same as the circuit structure of the pixel circuit; and/or a circuit structure of the first dummy scanning driving unit is the same as the circuit structure of the scanning driving unit.

In some embodiments, the display panel further includes a plurality of third dummy scanning driving units; a part of the third dummy scanning driving units is located on a side of the at least one first dummy scanning driving unit away from the scanning driving units and is electrically insulated from the at least one first dummy scanning driving unit; another part of the third dummy scanning driving units is located on a side of the scanning driving units away from the at least one first dummy scanning driving unit and is electrically insulated from the scanning driving units.

In some embodiments, the display panel further includes a first voltage signal line. A third dummy scanning driving unit includes a plurality of third shift registers, and each third shift register includes a start signal receiving terminal, a reset signal receiving terminal, and a plurality of clock signal receiving terminals and signal output terminals. At least one of the start signal receiving terminal, the reset signal receiving terminal, and the plurality of clock signal receiving terminals and signal output terminals is electrically connected to the first voltage signal line.

In some embodiments, a circuit structure of a third dummy scanning driving unit is the same as a circuit structure of a scanning driving unit.

In some embodiments, the display panel further includes a start signal line; the start signal line is connected to the at least one first dummy scanning driving unit; the display panel includes a plurality of first dummy scanning driving units that are cascaded, the start signal line is electrically connected to a first stage of first dummy scanning driving unit.

In some embodiments, the display panel further includes a plurality of clock signal lines. The plurality of clock signal lines are electrically connected to the at least one first dummy scanning driving unit and the scanning driving units; the display panel further includes a second dummy scanning driving unit, the plurality of clock signal lines are further electrically connected to the second dummy scanning driving unit.

In another aspect, another display panel is provided. The display panel includes a plurality of rows of pixel circuits, a plurality of scanning driving units that are cascaded, and a plurality of fourth dummy scanning driving units. The plurality of rows of pixel circuits are arranged in a first direction. Each scanning driving unit being configured to transmit a scanning signal to at least one row of pixel circuits. In the first direction, a part of the fourth dummy scanning driving units is located on a side of the scanning driving units and is electrically insulated from the scanning driving units, and another part of the fourth dummy scanning driving units is located on another side of the scanning driving units and is electrically insulated from the scanning driving units.

In another aspect, a display apparatus is provided. The display apparatus includes a driving circuit board and the display panel as described in any one of the above embodiments. The driving circuit board is connected to the display panel and configured to transmit control signals to the display panel.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
FIG. 1 is a structural diagram of a display apparatus, in accordance with some embodiments.

The technical solutions in embodiments of the present disclosure will be described clearly and completely with reference to the accompanying drawings.

Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to".

In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "electrically connected" and derivatives thereof may be used. For example, the term "electrically connected" may be used in the description of some embodiments to indicate that two or more components are in direct physical contact or electrical contact with each other.

The phrase "at least one of A, B and C" has the same meaning as the phrase "at least one of A, B or C", and they both include following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein means an open and inclusive expression, which does not exclude devices that are applicable to or configured to perform additional tasks or steps.

In addition, the phrase "based on" used is meant to be open and inclusive, since a process, step, calculation or other action that is "based on" one or more of the stated conditions or values may, in practice, be based on additional conditions or values exceeding those stated.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The term such as "parallel", "perpendicular" or "equal" as used herein includes a stated case and a case similar to the stated case within an acceptable range of deviation determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

Some embodiments of the present disclosure provide a display apparatus 1000, referring to FIG. 1, the display apparatus 1000 may be any device that displays an image whether in motion (e.g., video) or stationary (e.g., a still image), and whether textual or pictorial. For example, the display apparatus 1000 may be any product or component having a display function, such as a television, a notebook computer, a tablet computer, a mobile phone, an electronic photo, an electronic billboard or sign, a personal digital assistant (PDA), a navigator, a wearable device, an augmented reality (AR) device, or a dummy reality (VR) device. For example, the display apparatus 1000 may be a watch. For example, as shown in FIG. 1, the display apparatus 1000 may be a mobile phone.

The display apparatus 1000 may be a liquid crystal display (LCD) display apparatus. Alternatively, the display apparatus 1000 may also be an organic light-emitting diode (OLED) display apparatus, a quantum dot light-emitting diode (QLED) display apparatus or an active-matrix organic light-emitting diodes (AMOLED) display apparatus, the embodiments of the present disclosure are not specifically limited thereto.

Figure 2:
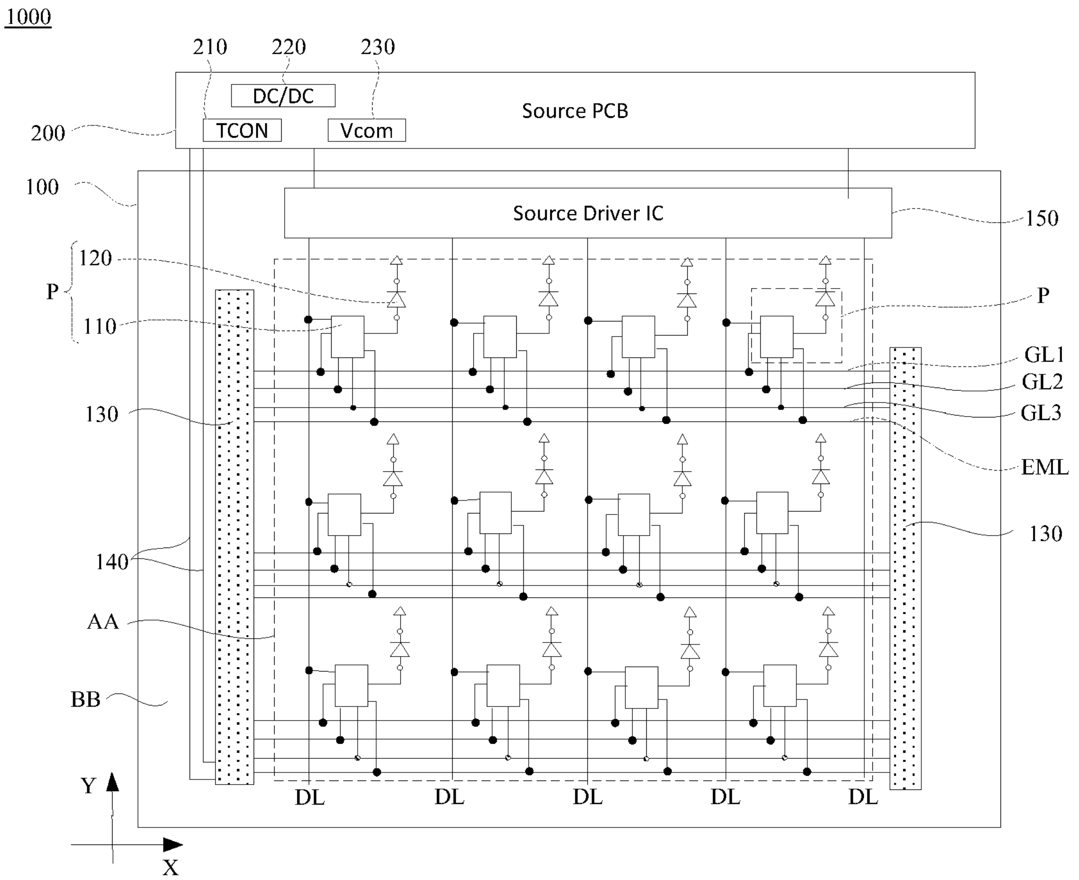
FIG. 2 is a structural diagram of a display panel and a driving circuit board, in accordance with some embodiments.

In some embodiments, referring to FIG. 2, FIG. 2 is a structural diagram of a display panel and a driving circuit board. The display apparatus 1000 includes a display panel 100 and a driving circuit board 200.

As shown in FIG. 2, the display panel 100 includes a display area AA and a peripheral area BB (also referred to as a non-display area). The peripheral area BB is located at least on a side of the display area AA. In the embodiments of the present disclosure, as shown in FIG. 2, which is described by taking an example in which the peripheral area BB surrounding the display area AA.

The display area AA includes a plurality of sub-pixels P, a plurality of data lines DL, and a plurality of scanning signal lines (for example, which may include a first scanning signal line GL1, a second scanning signal line GL2, a third scanning signal line GL3 and a light-emitting control signal line EML).

Referring to FIG. 2, the plurality of sub-pixels P are arranged in a plurality of rows. That is to say, the display panel 100 includes a plurality of rows of sub-pixels P. The plurality of rows of sub-pixels P are arranged in a first direction X, and each row of sub-pixels P include sub-pixels P arranged in a second direction Y. Alternatively, the plurality of sub-pixels P are arranged in a plurality of columns, the plurality of columns of sub-pixels P are arranged in the second direction X, and each column of sub-pixels P includes sub-pixels P arranged in the first direction Y. The first direction X and the second direction Y intersect with each other. For example, the first direction X is perpendicular to the second direction Y. It will be understood that, FIG. 2 only illustrates three rows and four columns of sub-pixels P, and the actual number, the number of arranged rows, and the number of arranged columns of the sub-pixels P included in the display panel 100 are all far more than those shown in FIG. 2. Therefore, FIG. 2 should not be construed as limiting the present disclosure.

For example, each sub-pixel P includes a pixel circuit 110 and a light-emitting device 120. The arrangement of a plurality of pixel circuits 110 included in the plurality of sub-pixels P may be the same as the arrangement of the plurality of sub-pixels P, that is, the display panel 100 includes a plurality of rows of pixel circuits 110 arranged in the first direction Y, and each row of pixel circuits 110 includes pixel circuits 110 arranged in the second direction X.

The pixel circuit 110 may include a plurality of thin film transistors (TFT) and a storage capacitor Cst. In the embodiments of the present disclosure, the specific structure of the pixel circuit 110 will be not specifically limited. For example, the pixel circuit 110 may be a "3T1 C" circuit, a "5T2C" circuit, a "7T1 C" circuit, an "8T2C" circuit, or the like, where "T" refers to TFT, and the number before "T" refers to the number of TFTs; "C" refers to the capacitor Cst, and the number before "C" refers to the number of capacitors Cst.

Figure 3:
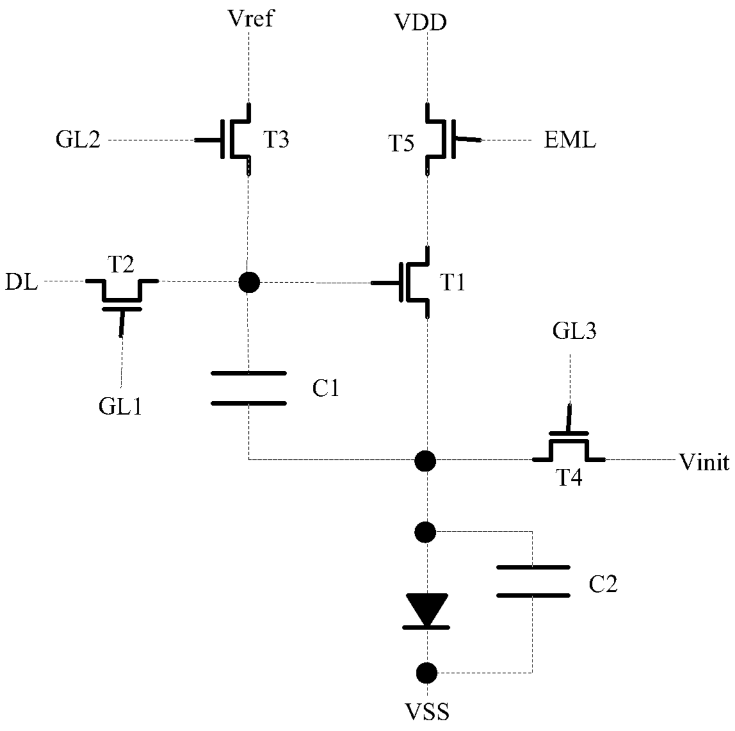
FIG. 3 is an equivalent circuit diagram of a pixel circuit, in accordance with some embodiments.

For example, referring to FIG. 3, FIG. 3 is an equivalent circuit diagram of the "5T2C" circuit. Some other embodiments of the present disclosure will be illustrated by taking an example in which the pixel circuit 110 is the "5T2C" circuit shown in FIG. 3. As shown in FIG. 3, the pixel circuit 110 may include a driving transistor T1, a data writing transistor T2, a resetting transistor T3, a reset transistor T4, a light-emitting control transistor T5, a first capacitor C1 and a second capacitor C2.

A gate of the data writing transistor T2 is electrically connected to the first scanning signal line GL1, a first electrode (e.g., source) of the data writing transistor T2 is electrically connected to the data signal line DL, and a second electrode (e.g., drain) of the data writing transistor T2 is electrically connected to a gate of the driving transistor T1. The data writing transistor T2 is turned on under control of a first scanning signal from the first scanning signal line GL1 to transmit a data signal from the data signal line DL to the gate of the driving transistor T1, so that the pixel circuit 110 achieves the function of data write.

A gate of the resetting transistor T3 is electrically connected to the second scanning signal line GL2, a first electrode of the resetting transistor T3 is electrically connected to a reference voltage signal line Vref, and a second electrode of the resetting transistor T3 is electrically connected to the gate of the driving transistor T1, that is, the second electrode of the resetting transistor T3 is electrically connected to the second electrode of the data writing transistor T2. The resetting transistor T3 is turned on under control of a second scanning signal from the second scanning signal line GL2 to transmit a reference voltage signal from the reference voltage signal line Vref to the gate of the driving transistor T1, so as to reset the voltage of the gate of the driving transistor T1.

A gate of the reset transistor T4 is electrically connected to the third scanning signal line GL3, a first electrode of the reset transistor T4 is electrically connected to an initialization voltage signal line Vinit, and a second electrode of the reset transistor T4 is electrically connected to an anode of the light-emitting device 120, i.e., the second electrode of the driving transistor T1. The reset transistor T4 is turned on under control of a third scanning signal from the third scanning signal line GL3 and transmit an initialization voltage signal from the initialization voltage signal terminal Vinit to the anode of the light-emitting device 120, so as to initialize the voltage of the anode of the light-emitting device 120.

A gate of the light-emitting control transistor T5 is electrically connected to the light-emitting control signal line EML, a first electrode of the light-emitting control transistor T5 is electrically connected to a third voltage signal line VDD, and a second electrode of the light-emitting control transistor T5 is electrically connected to the first electrode of the driving transistor T1. The light-emitting control transistor T5 is turned on under control of a light-emitting control signal from the light-emitting control signal line EML, and transmit a second voltage signal from the third voltage signal line VDD to the first electrode of the driving transistor T1; the driving transistor T1 generates a driving current due to the act of a voltage difference between the gate and the first electrode thereof, and the driving current is transmitted to the light-emitting device 120 to cause the light-emitting device 120 to emit light.

A plate of the first capacitor C1 is electrically connected to the gate of the driving transistor T1, and the other plate of the first capacitor C1 is electrically connected to the anode of the light-emitting device 120. The first capacitor C1 is used to maintain the voltage of the gate of the driving transistor T1. A plate of the second capacitor C2 is electrically connected to the anode of the light-emitting device 120, and the other plate of the second capacitor C2 is electrically connected to the cathode of the light-emitting device 120 to maintain the voltage difference between the anode and cathode of the light-emitting device 120.

Referring to FIG. 2, the peripheral area BB includes at least gate driver circuits 130, a plurality of signal lines 140 and a source driver 150. The source driver 150 may be, for example, a source driver integrated circuit (IC).

Figure 4:
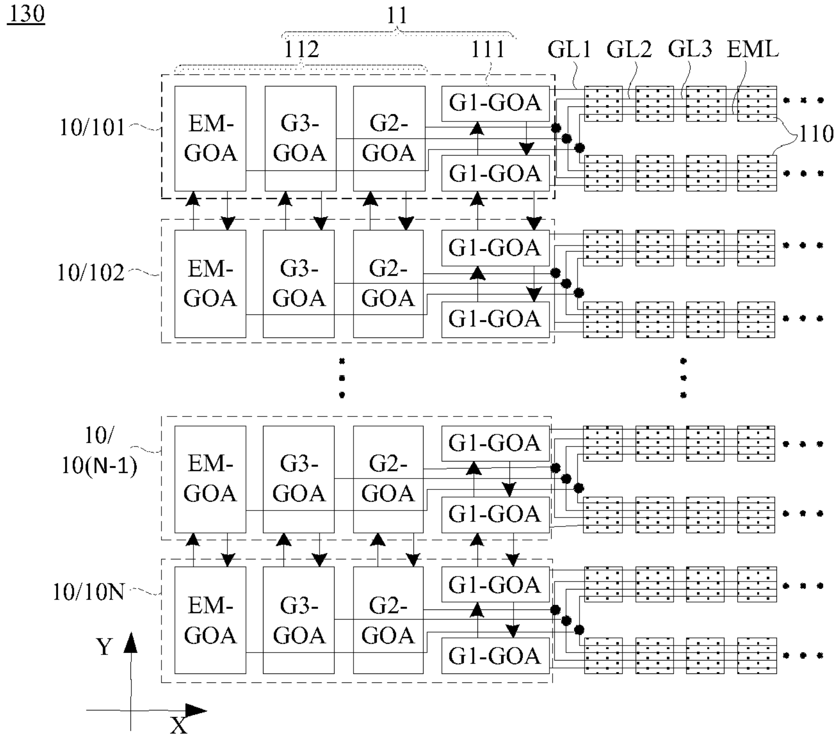
FIG. 4 is a structural diagram of a gate driver circuit, in accordance with some embodiments.

Referring to FIG. 4, the gate driver circuit 130 includes a plurality of cascaded scanning driving units 10, or in other words, the gate driver circuit 130 includes a plurality of stages of scanning driving units 10 arranged in sequence.

For example, the gate driver circuit 130 includes N scanning driving units 10. According to an order in which the scanning driving units 10 output signals, the N scanning driving units may be referred to as a first stage of scanning driving unit 101, a second stage of scanning driving unit 102, . . . , an (N-1)th stage of scanning driving unit 10(N-1) and a last stage of scanning driving unit 10N.

Each scanning driving unit 10 is configured to transmit a scanning signal to at least one row of pixel circuits 110. For example, as shown in FIG. 4, each scanning driving unit 10 is used to transmit all types of scanning signals required by the pixel circuits 110 to two rows of pixel circuits 110 electrically connected thereto. For example, in a case where the pixel circuit 110 is a "5T2C" circuit shown in FIG. 3, a scanning driving unit 10 is used to transmit a first scanning signal, a second scanning signal, a third scanning signal and a light-emitting control signal to at least one row of pixel circuits 110. That is, the scanning signals include the first scanning signal, the second scanning signal, the third scanning signal and the light-emitting control signal.

In some embodiments, as shown in FIG. 4, each scanning driving unit 10 includes a plurality of shift registers 11 for outputting all types of scanning signals to the same at least one row of pixel circuits 110. That is, each scanning driving unit 10 may include a plurality of shift registers 11, and each shift register 11 is used to output a type of scanning signal to at least one row of pixel circuits 110.

Referring to FIG. 4, the plurality of shift registers 11 may be divided into, for example, first shift registers 111 and second shift registers 112. The first shift register 111 is connected to a corresponding row of pixel circuits 110 and is configured to output a scanning signal to the corresponding row of pixel circuits 110 connected thereto. That is to say, the first shift register 111 refers to a shift register for driving a row of pixel circuits 110. The second shift register 112 is connected to two corresponding rows (or more than two rows, the embodiments of the present disclosure will be described by considering two rows as an example) of pixel circuits 110, and is configured to output a scanning signal to the two corresponding rows of pixel circuits 110 connected thereto. That is to say, the second shift register 112 refers to a shift register for driving two rows of pixel circuits 110.

As shown above, it will be understood that in the embodiments of the present application, the first shift register 111 refers to a type of shift register 11 that capable of independently outputting a scanning signal to a row of pixel circuits 110, rather than specifically referring to a shift register 11 for outputting a certain type of scanning signal (e.g., the first scanning signal). The first shift register 111 may include a plurality of sub shift registers, and each sub shift register is used to output a scanning signal. Similar to the first shift register, the second shift register 112 refers to a type of shift register 11 that capable of outputting a scanning signal to at least two rows of pixel circuits 110. The second shift register 112 may include at least one sub shift register, and each sub shift register is used to output a scanning signal to at least two rows of pixel circuits 110.

In some embodiments, the scanning signal output by the first shift register 111 is different from the scanning signal output by the second shift register 112. That is to say, multiple sub shift registers for outputting the same scanning signal are each electrically connected to one row of pixel circuits or two rows of pixel circuits. In this way, it is helpful to improve the load uniformity of the same type of scanning signal, thereby improving the display uniformity of the display panel.

For example, as shown in FIG. 4, the first shift register 111 may include a first sub shift register G1-GOA. The first sub shift register G1-GOA is electrically connected to a row of pixel circuits 110 through a first scanning signal line GL1 and configured to transmit the first scanning signal to the row of pixel circuits 110. The second shift register 112 may include a second sub shift register G2-GOA, a third sub shift register G3-GOA, and a fourth sub shift register EM-GOA. The second sub shift register G2-GOA is electrically connected to two adjacent rows of pixel circuits 110 through two second scanning signal lines GL2, and is configured to transmit the second scanning signal to the two adjacent rows of pixel circuits 110. The third sub shift register G3-GOA is electrically connected to two adjacent rows of pixel circuits 110 through two third scanning signal lines GL3, and is configured to transmit the third scanning signal to the two adjacent rows of pixel circuits 110. The fourth sub shift register EM-GOA is electrically connected to two adjacent rows of pixel circuits 110 through two light-emitting control signal lines EML, and is configured to transmit the light-emitting control signal to the two adjacent rows of pixel circuits 110.

It will be understood that, the arrangement order and the relative positions of the first sub shift register G1-GOA, the second sub shift register G2-GOA, the third sub shift register G3-GOA and the fourth sub shift register EM-GOA in the second direction X are not specifically limited in the embodiments of the present disclosure, and the positions shown in FIG. 4 are only exemplary.

In the case where the pixel circuit 110 is a "5T2C" circuit as shown in FIG. 3, as shown in FIG. 4, a scanning driving unit 10 includes two first sub shift registers G1-GOA, one second sub shift register G2-GOA, one third sub shift register G3-GOA, and one fourth sub shift register EM-GOA. Based on this, the scanning driving unit 10 may transmit a plurality of scanning signals (the first scanning signal, the second scanning signal, the third scanning signal and the light-emitting control signal) to two rows of pixel circuits 110.

The plurality scanning driving units 10 being cascaded refers to multiple sub shift registers, among the plurality of sub shift registers included in the plurality scanning driving units 10, for outputting a same scanning signal are cascaded. For example, a plurality of first sub shift registers G1-GOA included in the plurality of scanning driving units 10 are cascaded, a plurality of second sub shift registers G2-GOA included in the plurality of scanning driving units 10 are cascaded, and a plurality of third sub shift registers G3-GOA included in the plurality of scanning driving units 10 are cascaded, and a plurality of fourth sub shift registers EM-GOA included in the plurality of scanning driving units 10 are cascaded.

It will be understood that the specific circuit structures (e.g., the equivalent circuit and actual structure) of the first sub shift register G1-GOA, the second sub shift register G2-GOA, the third sub shift register G3-GOA and the fourth sub shift register EM-GOA are not specifically limited in the embodiments of the present disclosure.

Figure 5:
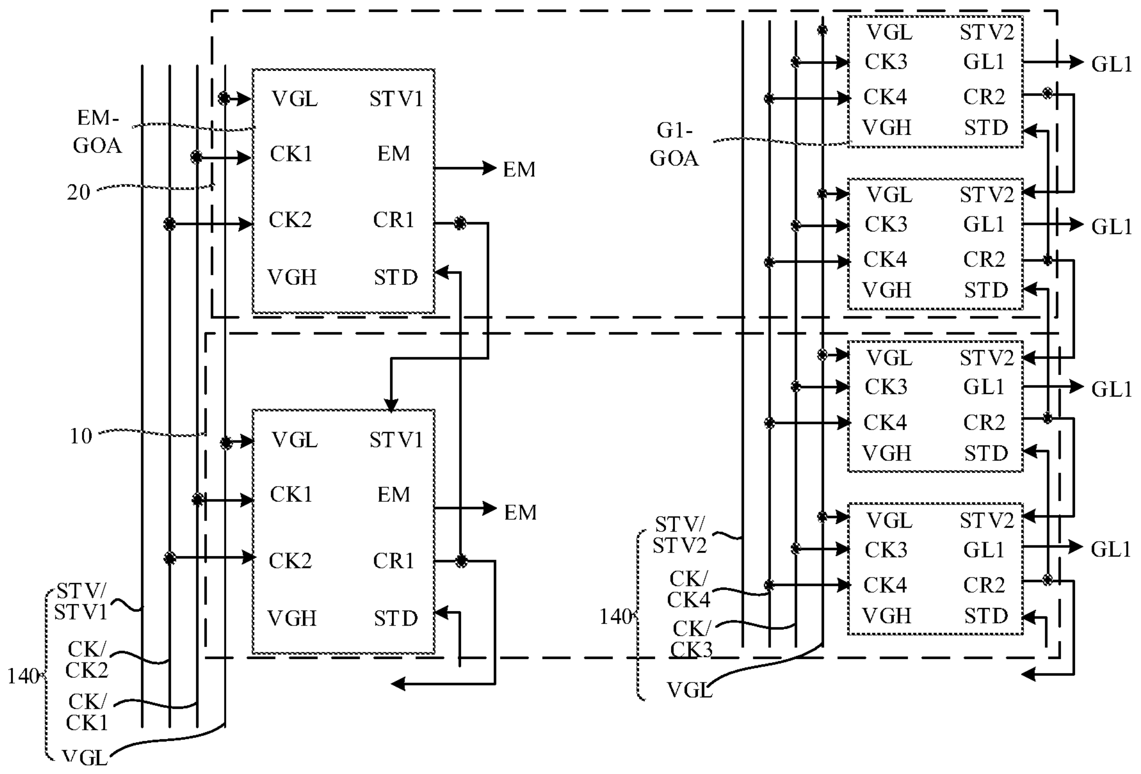
FIG. 5 is a diagram showing a cascade relationship of shift registers, in accordance with some embodiments.

As shown in FIG. 5, the plurality of signal lines 140 includes, for example, a plurality of clock signal lines CLK, a plurality of start signal line STV, first voltage signal lines VGL, and second voltage signal lines (not shown in the figure). The plurality of clock signal lines CK include at least, for example, a first clock signal line CK1, a second clock signal line CK2, a third clock signal line CK3, and a fourth clock signal line CK4; the plurality of start signal lines STV include at least, for example, a first start signal line STV1 and a second start signal line STV2. The first voltage signal line VGL is configured to transmit a voltage signal with a low voltage value. For example, the first voltage signal line VGL may be used to transmit a voltage signal with a negative voltage value.

As shown in FIG. 2, the driving circuit board 200 is electrically connected to the display panel 100 and used to transmit control signals to the display panel 100. In some embodiments, the driving circuit board 200 may include a timing controller IC (TCON IC) 210, a power management chip (DC/DC) 220 and an adjustable resistor voltage divider circuit (for generating Vcom) 230 and other driving circuits.

For example, the control signals may include a signal Vcom, a plurality of clock signals, a plurality of start signals, a first voltage signal and a second voltage signal, which are not listed here one by one. For example, the driving circuit board 200 is electrically connected to the source driver 150, and transmits the signal Vcom to the source driver 150 to control the source driver 150 to output data signals. The timing controller 210 in the driving circuit board 200 is electrically connected to the gate driver circuit 130 through the plurality of clock signal lines CK and the plurality of start signal lines STV, and the power management chip DC/DC in the driving circuit board 200 is electrically connected to the gate driver circuit 130 through the first voltage signal lines VGL and the second voltage signal lines. The driving circuit board 200 transmits the control signals (e.g., a clock signal, a start signal, a first voltage signal and a second voltage signal) to the gate driver circuit 130, so that the gate driver circuit 130 scans the plurality of row pixel circuits 110 row by row. In this way, the display panel 100 may display images due to the combined action of the electronic elements and circuits, such as the driving circuit board 200, the gate driver circuit 130, the source driver 150, the pixel circuits 100 and the light-emitting devices 120.

In the related art, the control signals (e.g., the start signals and clock signals) output by the driving circuit board are directly transmitted to a first stage of scanning driving unit, and the control signals (e.g., a start signal STV and a reset signal STD) are transmitted between the plurality of scanning driving units through signal lines (e.g., signal lines for transmitting cascade signals and signal lines for transmitting the reset signal). The rise delay and fall delay of the control signal during the transmission process between the driving circuit board and the first stage of scanning driving unit are different from the rise delay and fall delay of the control signal during the transmission process between the scanning driving units, that is to say, there may be a difference between the control signal received by the first stage of scanning driving unit and the control signals received by the remaining scanning driving units. In this way, there may be a difference between the scanning signal output by the first stage of scanning driving unit and the scanning signals output by the remaining scanning driving units, resulting in abnormal display grayscales of the first and second row of sub-pixels.

Figure 6:
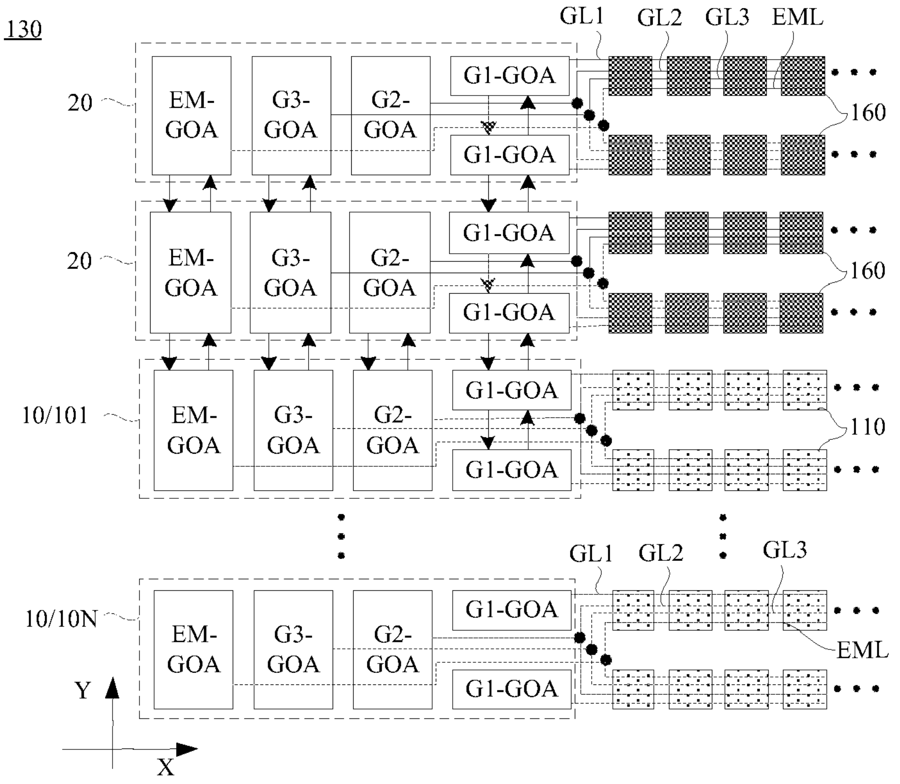
FIG. 6 is a structural diagram of another gate driver circuit, in accordance with some embodiments.
Figure 7:
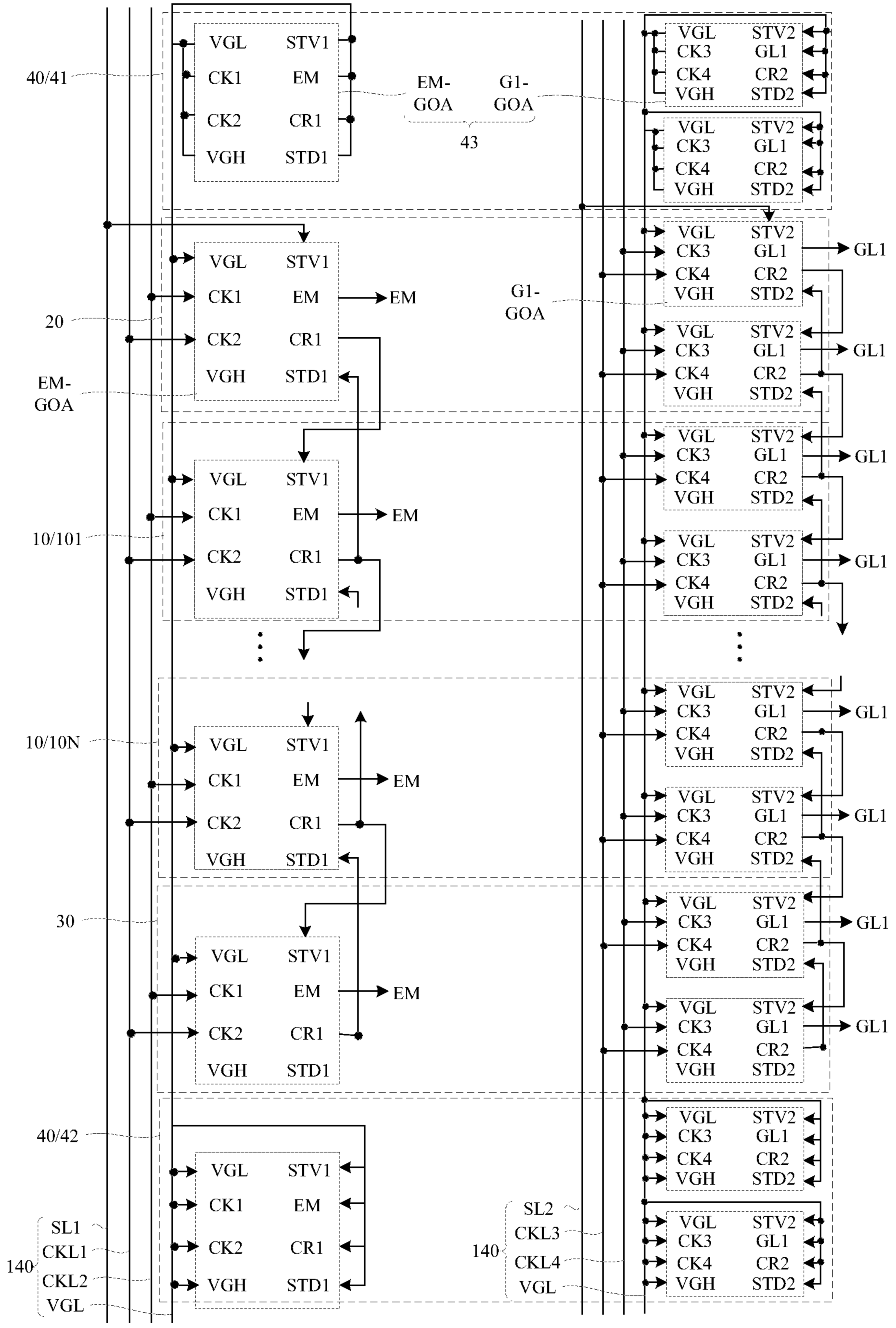
FIG. 7 is a diagram showing another cascade relationship of shift registers, in accordance with some embodiments.

In order to solve the above technical problems, referring to FIGS. 6 and 7, the display panel 100 provided by the embodiments of the present disclosure further includes a plurality of rows of first dummy pixel circuits 160 and at least one first dummy scanning driving unit 20. FIG. 7 is a diagram only showing an exemplary cascade relationship of the fourth sub shift register EM-GOA and the first sub shift register G1-GOA. The cascade relationship of the second sub shift register G2-GOA and the third sub shift register G3-GOA is similar to that of the fourth sub shift register EM-GOA, may refer to the cascade relationship of the fourth sub shift register EM-GOA, and is no longer shown in the figure.

The plurality of rows of first dummy pixel circuits 160 are disposed on a side of the plurality of rows of pixel circuits 110 in the first direction Y. For example, the plurality of rows of first dummy pixel circuits 160 are arranged adjacent to a first row of pixel circuits 110 (one row of pixel circuits 110 or two rows of pixel circuits 110 electrically connected to the first stage of scanning driving unit 101).

The at least one first dummy scanning driving unit 20 is cascaded to the first stage of scanning driving unit 101 among the plurality of scanning driving units 10, and is configured to transmit a cascade signal (a CR signal) to the first stage of scanning driving unit 101. That is, the first dummy scanning driving unit(s) 20 are arranged before the first stage of scanning driving unit 101 and are cascaded to the first stage of scanning driving unit 101. In this way, the start signal (e.g., the cascade signal) received by the first stage of scanning driving unit 101 may be the same or substantially the same as the start signals received by the remaining scanning driving units 10, and both the start signals are each the cascade signal output by the previous stage of scanning driving unit (or the first dummy scanning driving unit). Moreover, the rise delay and fall delay of the clock signal between the first dummy scanning driving unit 20 and the first stage of scanning driving unit 101 is substantially the same as the rise delay and fall delay of the clock signal between two adjacent scanning driving units 10. In this way, the identity (consistency) of the control signals received by the plurality of scanning driving units 10 may be improved. Based on this, it is possible to improve the consistency of the scanning signals output by the plurality of scanning driving units 10, thereby ensuring that the waveform of the scanning signal received by the first row of pixel circuits 110 is consistent with the waveform of the scanning signals received by the remaining rows of pixel circuits 110.

The inventors of the present disclosure have found through research that there may be certain differences in the sizes of the scanning signal line connected to the first row of pixel circuits 110 and the scanning signal lines connected to the remaining rows of pixel circuits 110 due to the uniformity of the manufacturing process, resulting in the different capacitive-resistance loading (RC loading) of the two mentioned above.

Referring to FIG. 6, the first dummy scanning driving unit 20 is further configured to transmit a scanning signal to at least one row of first dummy pixel circuits 160, that is, the first dummy scanning driving unit 20 is electrically connected at least one row of first dummy pixel circuits 160 through scanning signal line(s). In this way, the scanning signal output by the first dummy scanning driving unit 20 will also be transmitted on the scanning signal line, which may improve the uniformity of the capacitive-resistive loading of the scanning signals output by the plurality of scanning driving units 10, thereby further improve the consistency of the scanning signals output by the plurality of scanning driving units 10 to ensure that the waveform of the scanning signal received by the first row of pixel circuits 110 is consistent with the waveform of the scanning signals received by the remaining rows of pixel circuits 110.

It will be understood that during the process of forming TFTs, the uniformity of the TFTs located at the edge of the display area AA is poor. Due to the provision of the first dummy pixel circuits 160, it may also be possible to improve the uniformity of the TFTs included in the first row of pixel circuits 110. Specifically, due to the provision of the first dummy pixel circuits 160, it may be possible to ensure the consistency of the width-to-length ratios of the TFTs in the plurality of rows of pixel circuits 110 and the consistency of the sizes of the signal lines during the process of manufacturing the pixel circuits 110, thereby reducing the risk of defects in the first row of pixel circuits 110.

In some embodiments, the circuit structure of the first dummy pixel circuit 160 is the same as the circuit structure of the pixel circuit 110. In this way, it is helpful to further improve the uniformity of the first row of pixel circuits 110 and the remaining rows of pixel circuits 110, and reduce the risk of defects in the first row of pixel circuits 110.

In the embodiments of the present disclosure, the circuit structure may include at least shapes of the equivalent circuit diagram and the circuit structure, and the sizes of the equivalent circuit diagram and the circuit structure. For example, the circuit structure of the first dummy pixel circuit 160 being the same as the circuit structure of the pixel circuit 110 may refer that the first dummy pixel circuit 160 and the pixel circuit 110 are exactly the same in structure, but the spatial position on the display panel 100 and the connection relationship with the signal lines are not exactly the same.

In some embodiments, the circuit structure of the first dummy scanning driving unit 20 is the same as the circuit structure of the scanning driving unit 10. In this way, it is beneficial to improve the uniformity of the first stage of scanning driving unit 101 and the remaining scanning driving units 10, and reduce the risk of defects in the first stage of scanning driving unit 101; and moreover, it is possible to make the first dummy scanning driving unit 20 and the plurality of scanning driving units 10 output the same scanning signal.

In some other embodiments, the circuit structure of the first dummy scanning driving unit 20 may be different from the circuit structure of the scanning driving unit 10. The scanning signal output by the first dummy scanning driving unit 20 is not used to control the display panel for display. In this way, it is possible to, for example, simplify (compared to the circuit structure of the scanning driving unit 10) the circuit structure of the first dummy scanning driving unit 20 to simplify the structure of the display panel 100, which may be beneficial to reducing the difficulty of manufacturing the first dummy scanning driving unit 20.

In some embodiments, in a case where the scanning driving unit 10 is configured to transmit a scanning signal to two rows of pixel circuits 110, the first dummy scanning driving unit 20 is configured to transmit a scanning signal to two rows of first dummy pixel circuits 160.

The first dummy scanning driving unit 20 may include a first shift register 111 and a second shift register 112. The first shift register 111 is correspondingly connected to one row of first dummy pixel circuits 160, and is configured to output a scanning signal to the correspondingly connected row of first dummy pixel circuits 160. The second shift register 112 is correspondingly connected to two rows (or more than two rows, in the embodiments of the present disclosure, two rows are considered as an example) of first dummy pixel circuits 160, and is configured to output a scanning signal to the two correspondingly connected rows of first dummy pixel circuits 160.

For example, in a case where the circuit structure of the first dummy scanning driving unit 20 is the same as the circuit structure of the scanning driving unit 10, the circuit structures of the plurality of shift registers included in the first dummy scanning driving unit 20 are the same as the circuit structures of the plurality of shift registers included in the scanning driving unit 10, respectively. For example, the first dummy scanning driving unit 20 and the scanning driving unit 10 each include two first sub shift registers G1-GOA, one second sub shift register G2-GOA, one third sub shift register G3-GOA and one fourth sub shift register EM-GOA, and the circuit structures of the first sub shift registers G1-GOA, second sub shift register G2-GOA, third sub shift register G3-GOA and fourth sub shift register EM-GOA included in the first dummy scanning driving unit 20 are respectively the same as the circuit structures of the first sub shift registers G1-GOA, second sub shift register G2-GOA, third sub shift register G3-GOA and fourth sub shift register EM-GOA included in the scanning driving unit 10. In this way, the scanning signal output by the first dummy scanning driving unit 20 may be the same as the scanning signal output by the scanning driving unit 10. That is to say, the first dummy scanning driving unit 20 and the scanning driving unit 10 may be exactly the same in structure.

In some embodiments, as shown in FIG. 6, the display panel 100 includes a plurality of first dummy scanning driving unit 20 that are cascaded. In FIG. 6, only two first dummy scanning driving units 20 are illustrated as an example. That is to say, there are a plurality of first dummy scanning driving units 20, the plurality of first dummy scanning driving units 20 are arranged in cascade in sequence, and the last stage of first dummy scanning driving unit 20 among the plurality of first dummy scanning driving units 20 is cascaded to the first stage of scanning driving unit 101. Increasing the number of first dummy scanning driving units 20 may further improve the consistency of the control signal received by the first stage of scanning driving unit 101 and the control signals received by the remaining scanning driving units 10, and may further improve the uniformity of the output signals of the plurality of scanning driving units 10.

For example, there are two first dummy scanning driving units 20, so that four rows of first dummy pixel circuits 160 may be set. Each first dummy scanning driving unit 20 is connected to two rows of first dummy pixel circuits 160 and transmits a scanning signal to the two rows of first dummy pixel circuits 160. The display panel 100 provided by the embodiments of the present disclosure may be provided with two or three first dummy scanning driving units 20. However, in order to simplify the drawing structure, only one first dummy scanning driving unit 20 is exemplary illustrated in other figures.

Figure 8:
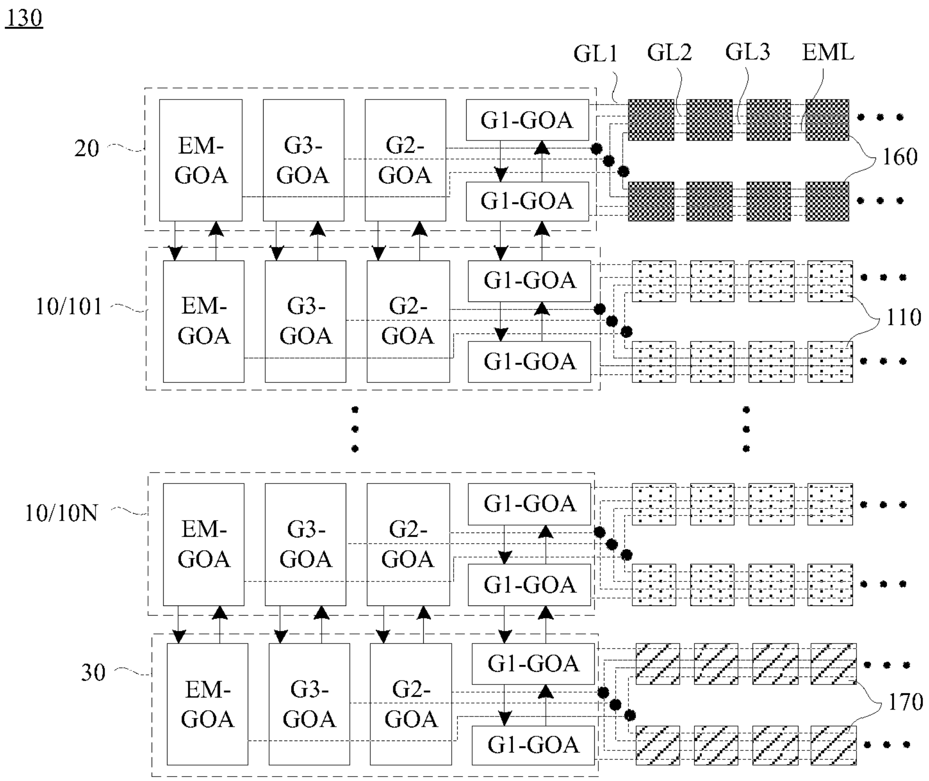
FIG. 8 is a structural diagram of yet another gate driver circuit, in accordance with some embodiments.

In some embodiments, referring to FIG. 8, the display panel 100 further includes at least one row of second dummy pixel circuits 170 and at least one second dummy scanning driving unit 30. The second dummy pixel circuits 170 are located on a side of the plurality of rows of pixel circuits 110 away from the first dummy pixel circuits 160. That is to say, the first dummy pixel circuits 160 and the second dummy pixel circuits 170 are respectively located on opposite sides of the plurality of rows pixel circuit 110 in the first direction Y. Similar to the first dummy pixel circuit 160, due to the provision of the second dummy pixel circuits 170, it may be possible to improve the structural uniformity of the last row of pixel circuits 110, thereby reducing the risk of defects in the last row of pixel circuits 110 (one row or two rows of pixel circuits 110 electrically connected to the last stage of scanning driving unit 10N), which will not repeated here.

The second dummy scanning driving unit 30 is cascaded to the last stage of scanning driving unit 10N among the plurality of scanning driving units 10, and the second dummy scanning driving unit 30 is configured to: receive a cascade signal output by the last stage of scanning driving unit 10N, output a scanning signal to at least one row of second dummy pixel circuits 170; and provide a reset signal for the last stage of scanning driving unit 10N. Due to the provision of the second dummy scanning driving unit 30, it may be possible to improve the consistency of the scanning signal output by the last stage of scanning driving unit 10N and the scanning signals output by the remaining scanning driving units 10.

In some embodiments, the number of rows of the first dummy pixel circuit 160 is equal to the number of rows of the second dummy pixel circuit 170, and the number of the first dummy scanning driving units 20 is equal to the number of the second dummy scanning driving units 30. In this way, it is possible to improve the uniformity of the first row of pixel circuits 110 and the last row of pixel circuits 110 in the plurality of rows of pixel circuits 110, thereby improving the uniformity of the plurality of rows of pixel circuits 110 to improve the display effect of the display panel 100.

In some embodiments, the circuit structure of the second dummy pixel circuit 170 is the same as the circuit structure of the pixel circuit 110. Furthermore, the circuit structure of the first dummy pixel circuit 160 is also the same as the circuit structure of the pixel circuit 110, which is beneficial to improving the structural uniformity of the display panel. For example, the first dummy pixel circuit 160, the second dummy pixel circuit 170 and the pixel circuit 110 are all the "5T2C" circuit shown in FIG. 3.

In some embodiments, the circuit structure of the second dummy scanning driving unit 30 is the same as the circuit structure of the scanning driving unit 10. Furthermore, the circuit structure of the first dummy scanning driving unit 20 is also the same as the circuit structure of the scanning driving unit 10. In this way, it is possible to improve the consistency of the structure of the display panel 100 and reduce the manufacturing difficulty and cost of the display panel 100.

It will be understood that since the second dummy pixel circuits 170 electrically connected to the second dummy scanning driving unit 30 are not electrically connected to the light-emitting devices, that is to say, the second dummy scanning driving unit 30 does not directly control the sub-pixels to emit light. Therefore, in some other embodiments, the circuit structure of the second dummy scanning driving unit 30 may be different from the circuit structure of the scanning driving unit 10. For example, the circuit structure of the second dummy scanning driving unit 30 is the same as the circuit structure of the first dummy scanning driving unit 20, and both are simplified in design compared to the circuit structure of the scanning driving unit 10, which is conducive to simplifying the circuit structure of the display panel. Of course, in some other embodiments, the circuit structure of the first dummy scanning driving unit 20, the circuit structure of the second dummy scanning driving unit 30 and the circuit structure of the scanning driving unit 10 may also be different from one another, or the circuit structures of two of them are the same, which will not be repeated here.

Figure 9:
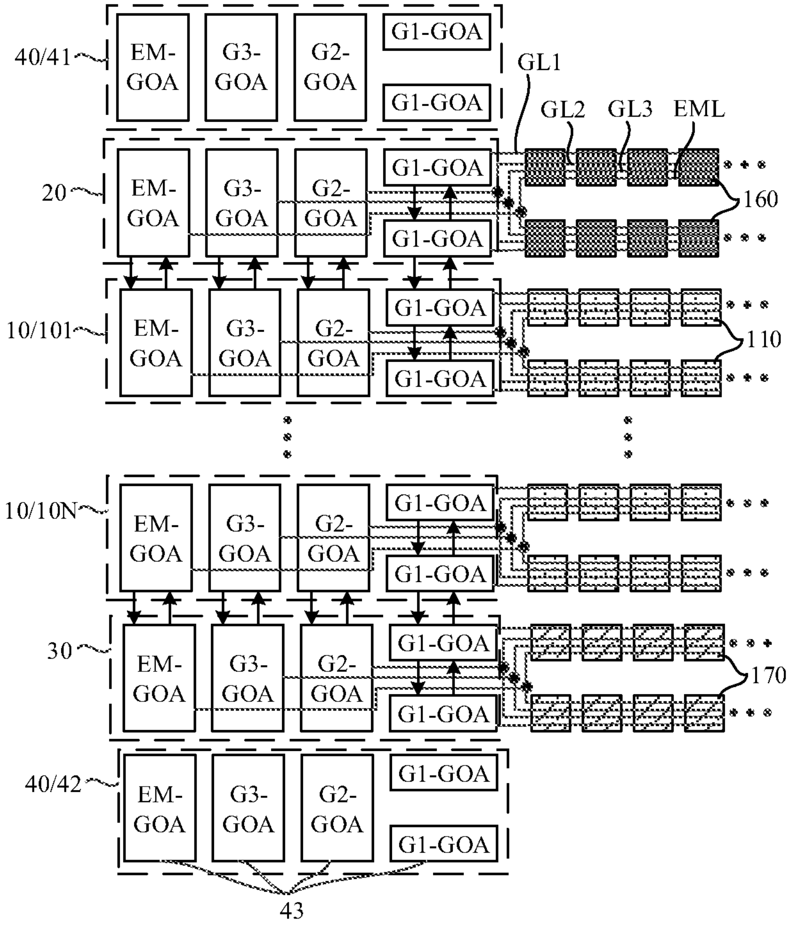
FIG. 9 is a structural diagram of a gate driver circuit, in accordance with some embodiments.

In some embodiments, as shown in FIGS. 7 and 9, the display panel 100 further includes a plurality of third dummy scanning driving units 40. A part of the plurality of third dummy scanning driving units 40 (hereinafter referred to as a first part of third dummy scanning driving units 41) is located on a side of the first dummy scanning driving unit 20 away from the scanning driving units 10 and is electrically insulated from the first dummy scanning driving unit 20. That is to say, the third dummy scanning driving unit 40 arranged before (on the upper side of) the first dummy scanning driving unit 20 is not cascaded to the first dummy scanning driving unit 20. Another part of the plurality of third dummy scanning driving units 40 (hereinafter referred to as a second part of third dummy scanning driving units 42) is located on a side of the scanning driving units 10 away from the first dummy scanning driving unit 20 and is electrically insulated from the scanning driving units 10. That is to say, the third dummy scanning driving unit 40 arranged behind (on the below side of) the scanning driving units 10 is not cascaded to the scanning driving units 10. Due to the provision of the third dummy scanning driving units 40, it is possible to improve the uniformity of the structure of the first dummy scanning driving unit 20 and the scanning driving unit 10 during the manufacturing process of the display panel, for example, improve the uniformity of the width-to-length ratios of TFTs included in the first dummy scanning driving unit 20 and that of the scanning driving unit 10, and improve the uniformity of the sizes of the signal lines.

It will be understood that, in a case where the display panel 100 further includes a plurality of second dummy scanning driving units 30, another part of the plurality of third dummy scanning driving units 40 (the second part of third dummy scanning driving units 42) is located on a side of the second dummy scanning driving units 30 away from the first dummy scanning driving unit 20, and is electrically insulated from the second dummy scanning driving units 30. Due to the provision of the third dummy scanning driving units 40, it is also possible to improve the uniformity of the structure of the second dummy scanning driving unit 30 and the scanning driving unit 10.

In some embodiments, the number of the first part of third dummy scanning driving units 41 and the number of the second part of third dummy scanning driving units 42 are the same. That is, the same number of third dummy scanning driving units 40 is disposed on each of the two sides of the scanning driving units 10 in the first direction Y. For example, one third dummy scanning driving unit 40 is disposed on each of two sides of the scanning driving units 10 in the first direction Y.

In some embodiments, referring to FIGS. 7 and 9, the third dummy scanning driving unit 40 includes a plurality of third shift registers 43. Each third shift register 43 includes start signal receiving terminals, reset signal receiving terminals, and a plurality of clock signal receiving terminals and signal output terminals; at least one of the start signal receiving terminals, the reset signal receiving terminals, and the plurality of clock signal receiving terminals and signal output terminals is electrically connected to the first voltage signal line. That is to say, the third dummy scanning driving units 40 are not cascaded and do not output scanning signals. In this way, it is possible to reduce the risk that signals cannot be transmitted to the scanning driving units 10 normally due to defects in the third dummy scanning driving units 40.

For example, the circuit structure of the third dummy scanning driving unit 40 may be the same as the circuit structure of the scanning driving unit 10. That is to say, the circuit structures of the first dummy scanning driving unit 20, the second dummy scanning driving unit 30, the third dummy scanning driving unit 40 and the scanning driving unit 10 are all the same. The plurality of third shift registers 43 in the third dummy scanning driving unit 40 each include two first sub shift registers G1-GOA, one second sub shift register G2-GOA, one third sub shift register G3-GOA and one fourth sub shift register EM-GOA.

For example, as shown in FIG. 7, the plurality of signal lines 140 include a first start signal line SL1, a first clock signal line CKL1, a second clock signal line CKL2, a first voltage signal line VGL, a second start signal line SL2, a third clock signal line CKL3 and a fourth clock signal line CKL4. The first sub shift register G1-GOA includes a second start signal receiving terminal STV2, a second reset signal receiving terminal STD2, a third clock signal receiving terminal CK3, a fourth clock signal receiving terminal CK4, a first scanning signal output terminal GL1 and a second cascade signal output terminal CR2. The fourth sub shift register EM-GOA includes a first start signal receiving terminal STV1, a first reset signal receiving terminal STD1, a first clock signal receiving terminal CK1, a second clock signal receiving terminal CK2, a light-emitting control signal output terminal EM and a first cascade signal output terminal CR1.

At least one of the second start signal receiving terminal STV2, the second reset signal receiving terminal STD2, the third clock signal receiving terminal CK3, the fourth clock signal receiving terminal CK4, the first scanning signal output terminal GL1 and the second cascade signal output terminal CR2 included in the first sub shift register G1-GOA included in the third dummy scanning driving unit 40 is electrically connected to the first voltage signal line VGL. For example, the second start signal receiving terminal STV2, the second reset signal receiving terminal STD2, the first scanning signal output terminal GL1 and the second cascade signal output terminal CR2 are electrically connected to the first voltage signal line VGL, or the second start signal receiving terminal STV2, the second reset signal receiving terminal STD2, the third clock signal receiving terminal CK3, the fourth clock signal receiving terminal CK4, the first scanning signal output terminal GL1 and the second cascade signal output terminal CR2 are all electrically connected to the first voltage signal line VGL, which will not be listed one by one in the embodiments of the present disclosure.

At least one of the first start signal receiving terminal STV1, the first reset signal receiving terminal STD1, the first clock signal receiving terminal CK1, the second clock signal receiving terminal CK2, the light-emitting control signal output terminal EM and the first cascade signal output terminal CR1 included in the fourth sub shift register EM-GOA is electrically connected to the first voltage signal line VGL. For example, the light-emitting control signal output terminal EM and the first cascade signal output terminal CR1 are electrically connected to the first voltage signal line VGL, or the first start signal receiving terminal STV1, the first reset signal receiving terminal STD1, the first clock signal receiving terminal CK1, the second clock signal receiving terminal CK2, the light-emitting control signal output terminal EM and the first cascade signal output terminal CR1 are all electrically connected to the first voltage signal line VGL, which will not be listed one by one in the embodiments of the present disclosure.

Referring to FIG. 7, in some embodiments, the display panel includes start signal lines (e.g., a first start signal line SL1 and a second start signal line SL2). The start signal lines are connected to the first dummy scanning driving unit 20, and in a case where the display panel 100 includes a plurality of cascaded first dummy scanning driving units 20, the start signal lines are electrically connected to the first stage of first dummy scanning driving unit 20; that is, the first dummy scanning driving unit 20 are cascaded from the first stage of first dummy scanning driving unit 20 and output the scanning signal.

Referring to FIG. 7, the display panel 100 further includes a plurality of clock signal lines (e.g., the first clock signal line CKL1, the second clock signal line CKL2, the third clock signal line CKL3 and the fourth clock signal line CKL3). The plurality of clock signal lines are electrically connected to the first dummy scanning driving unit 20 and the scanning driving units 10 respectively. Moreover, in the case where the display panel 100 further includes the second dummy scanning driving unit 30, the plurality of clock signal lines are also electrically connected to the second dummy scanning driving unit 30.

For the specific connection relationship between the start signal lines and the first dummy scanning driving unit 20, and the specific connection relationships between the clock signal lines and the first dummy scanning driving unit 20, the scanning driving units 10 and the second dummy scanning driving unit 30, reference made to the above description, which will not be repeated here.

Some other embodiments of the present disclosure provide a display panel 100.

Figure 10:
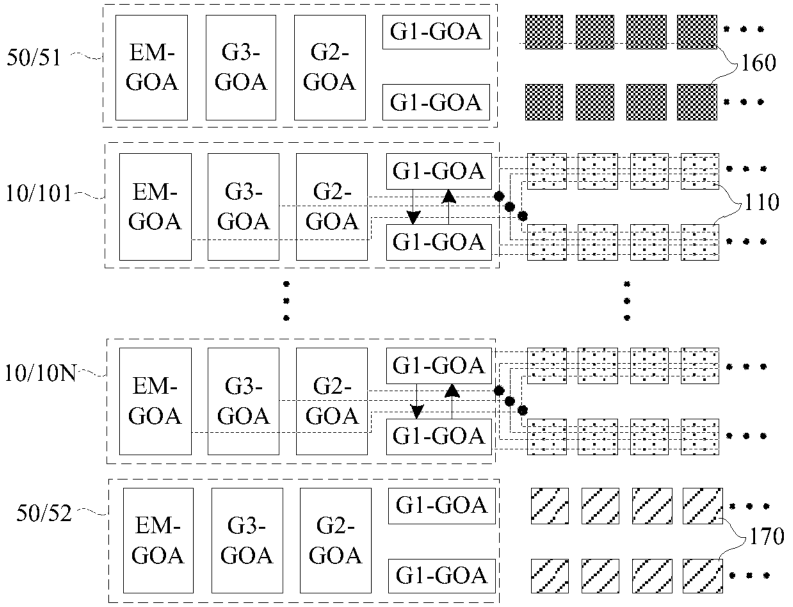
FIG. 10 is a structural diagram of yet another gate driver circuit, in accordance with some embodiments.

Referring to FIG. 10, the display panel 100 includes a plurality of rows of pixel circuits 110, a plurality of scanning driving units 10 that are cascaded, and a plurality of fourth dummy scanning driving units 50.

The plurality of rows of pixel circuits 110 are arranged in the first direction Y. The structures and arrangement of the pixel circuits 110 may be the same as those of the pixel circuits 110 in the above embodiments, and will not be repeated here. Each scanning driving unit 10 is configured to transmit a scanning signal to at least one row of pixel circuits 110. The circuit structure of the scanning driving unit 10 and the connection relationship between the scanning driving unit 10 and the pixel circuit(s) 110 are respectively the same as the circuit structure of the scanning driving unit 10 and the connection relationship between the scanning driving unit 10 and the pixel circuit(s) 110 in the above embodiments.

In the first direction Y, a part of the fourth dummy scanning driving units 51 (hereinafter referred to as a first part of fourth dummy scanning driving units 51) is located on a side (e.g., the upper side in FIG. 10) of the scanning driving units 10 and is electrically insulated from the scanning driving units 10; another part of the fourth dummy scanning driving units 52 (hereinafter referred to as a second part of fourth dummy scanning driving units 52) is located on the other side (e.g., the upper side in FIG. 10) of the scanning driving units 10 and is electrically insulated from the scanning driving units 10. Due to the provision of the plurality of fourth dummy scanning driving units 50, it is possible to improve the uniformity of the scanning driving units 10, and thereby improve the uniformity of the scanning signals output by the scanning driving units 10.

For example, the first part of fourth dummy scanning driving units 51 is not cascaded to the first stage of scanning driving unit 101, and is electrically insulated from the first dummy pixel circuits 160. The second part of fourth dummy scanning driving units 52 is not cascaded to the last stage of scanning driving unit 10N, and is electrically insulated from the second dummy pixel circuits 170.

It will be understood that in some other possible implementations, the structure of the display panel 100 may be partially simplified or modified in the embodiments shown in FIG. 9, and these possible implementations should all fall within the protection scope of the present disclosure.

For example, the display panel 100 may include one, two, or three of the first dummy scanning driving unit 20, the second dummy scanning driving unit 30, the first part of third dummy scanning driving units 41, and the second part of third dummy scanning driving units 42.

For example, the display panel 100 may only include the scanning driving units 10, the first dummy scanning driving unit 20 and the first part of third dummy scanning driving unit 41; alternatively, the display panel 100 may only include the scanning driving units 10, the first dummy scanning driving unit 20 and the second part of third dummy scanning driving unit 42; alternatively, the display panel 100 may only include the scanning driving units 10 and the first part of third dummy scanning driving units 41; alternatively, the display panel 100 may only include the scanning driving units 10 and the second part of third dummy scanning driving unit 42; which will not be listed one by one in the embodiments of the present disclosure.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A display panel, comprising:

a plurality of rows of pixel circuits arranged in a first direction;

a plurality of rows of first dummy pixel circuits located on a side of the plurality of rows of pixel circuits in the first direction;

a plurality of scanning driving units that are cascaded, each scanning driving unit being configured to transmit a scanning signal to at least one row of pixel circuits; and at least one first dummy scanning driving unit cascaded to a first stage of scanning driving unit among the plurality of scanning driving units; wherein a first dummy scanning driving unit is configured to: transmit a cascade signal to the first stage of scanning driving unit; and transmit scanning signals to at least two rows of first dummy pixel circuits of the plurality of rows of first dummy pixel circuits; and the first dummy scanning driving unit includes: a first shift register connected to a row of first dummy pixel circuits of the at least two rows of first dummy pixel circuits and configured to output a scanning signal to the corresponding connected row of first dummy pixel circuits, and a second shift register correspondingly connected to the at least two rows of first dummy pixel circuits and configured to output a scanning signal to the at least two corresponding connected rows of first dummy pixel circuits; and the scanning signal output by the first shift register is different from the scanning signal output by the second shift register.

2. The display panel according to claim 1, wherein the display panel comprises a plurality of first dummy scanning driving units that are cascaded, wherein a last stage of first dummy scanning driving unit among the plurality of first dummy scanning driving units is cascaded to the first stage of scanning driving unit.

3. The display panel according to claim 1, wherein a circuit structure of a first dummy pixel circuit is the same as a circuit structure of a pixel circuit.

4. The display panel according to claim 1, wherein a circuit structure of the first dummy scanning driving unit is the same as a circuit structure of a scanning driving unit.

5. The display panel according to claim 1, wherein a circuit structure of the first dummy scanning driving unit is different from a circuit structure of a scanning driving unit.

6. The display panel according to claim 1, further comprising:

at least one row of second dummy pixel circuits located on a side of the plurality of rows of pixel circuits away from the at least one row of first dummy pixel circuits; and at least one second dummy scanning driving unit cascaded to a last stage of scanning driving unit among the plurality of scanning driving units and configured to:

receive a cascade signal output by the last stage of scanning driving unit; and output a scanning signal to the at least one row of second dummy pixel circuits.

7. The display panel according to claim 6, wherein a number of rows of first dummy pixel circuits included in the display panel is equal to a number of rows of second dummy pixel circuits included in the display panel, and a number of first dummy scanning driving units included in the display panel is equal to a number of second dummy scanning driving units included in the display panel.

8. The display panel according to claim 6, wherein a circuit structure of a second dummy pixel circuit is the same as a circuit structure of a pixel circuit.

9. The display panel according to claim 6, wherein a circuit structure of a second dummy scanning driving unit is the same as a circuit structure of a scanning driving unit.

10. The display panel according to claim 1, further comprising:

a plurality of third dummy scanning driving units, wherein a part of the third dummy scanning driving units is located on a side of the at least one first dummy scanning driving unit away from the scanning driving units and is electrically insulated from the at least one first dummy scanning driving unit; another part of the third dummy scanning driving units is located on a side of the scanning driving units away from the at least one first dummy scanning driving unit and is electrically insulated from the scanning driving units.

11. The display panel according to claim 10, further comprising:

a first voltage signal line; wherein a third dummy scanning driving unit includes a plurality of third shift registers, each third shift register includes a start signal receiving terminal, a reset signal receiving terminal, and a plurality of clock signal receiving terminals and signal output terminals, and at least one of the start signal receiving terminal, the reset signal receiving terminal, and the plurality of clock signal receiving terminals and signal output terminals is electrically connected to the first voltage signal line.

12. The display panel according to claim 1, further comprising:

a start signal line connected to the at least one first dummy scanning driving unit, wherein the display panel comprises a plurality of first dummy scanning driving units that are cascaded, the start signal line is electrically connected to a first stage of first dummy scanning driving unit.

13. The display panel according to claim 1, further comprising:

a plurality of clock signal lines electrically connected to the at least one first dummy scanning driving unit and the scanning driving units; wherein the display panel further comprises a second dummy scanning driving unit, the plurality of clock signal lines are further electrically connected to the second dummy scanning driving unit.

14. A display apparatus, comprising:

the display panel according to claim 1; and a driving circuit board connected to the display panel and configured to transmit control signals to the display panel.

15. The display panel according to claim 6, wherein a circuit structure of a first dummy pixel circuit is the same as the circuit structure of the pixel circuit; and/or a circuit structure of the first dummy scanning driving unit is the same as the circuit structure of the scanning driving unit.

16. The display panel according to claim 11, wherein a circuit structure of a third dummy scanning driving unit is the same as a circuit structure of a scanning driving unit.

* * * * *